0
United States Patent

Gardner

[15] 3,657,048
[45] Apr. 18, 1969

[54] METHOD OF BONDING ELASTOMERIC MATERIALS

[72] Inventor: John C. Gardner, Lymm, England

[73] Assignee: J. H. Fenner & Co. Limited, Marfleet, Hull, England

[22] Filed: Nov. 25, 1968

[21] Appl. No.: 778,816

[30] Foreign Application Priority Data

Nov. 28, 1969   Great Britain ..................... 53,995/67

[52] U.S. Cl. ............................. 156/331, 156/332, 156/333
[51] Int. Cl. .................................................... C09j 3/00
[58] Field of Search .............. 156/110 A, 307, 308, 331, 332, 156/333, 334; 260/29.6

[56] References Cited

UNITED STATES PATENTS

| | | |
|---|---|---|
| 3,032,460 | 5/1962 | Chipman et al. ..................... 156/332 X |
| 3,036,977 | 5/1962 | Koch et al. .......................... 156/332 X |
| 3,132,983 | 5/1964 | Osborne et al. ........................ 156/308 |
| 3,135,645 | 6/1964 | Burkley et al. ..................... 156/332 X |
| 3,321,351 | 5/1967 | Bäder ..................................... 156/332 |
| 3,333,025 | 7/1967 | Bäder .................................. 156/332 X |
| 3,483,155 | 12/1969 | Samour ............................... 156/332 X |

*Primary Examiner*—Carl D. Quarforth
*Assistant Examiner*—Stephen J. Lechert, Jr.
*Attorney*—Beveridge & De Grandi

[57] ABSTRACT

Polyvinyl chloride is bonded to natural or synthetic elastomers by means of a solution grafted copolymer of an acrylic monomer and a synthetic elastomer. If the elastomer is natural rubber or a sulphur modified chloroprene elastomer, a solution grafted copolymer of methyl methacrylate, butadiene and preferably also acrylonitrile, is used. If the elastomer is a non-sulphur modified chloroprene rubber, a solution grafted copolymer of methyl methacrylate and chloroprene rubber is used.

3 Claims, No Drawings

METHOD OF BONDING ELASTOMERIC MATERIALS

This invention relates to methods of bonding natural or synthetic elastomeric compositions to polyvinyl chloride (P.V.C.) using bonding agents produced by graft polymerisation techniques.

It has previously been known to treat P.V.C. with a solution grafted co-polymer of methyl methacrylate and natural rubber in order to bond to natural rubber. Whilst this method achieves a degree of bonding it is not entirely satisfactory since bond strengths decrease considerably with increase of temperature. Furthermore, natural rubber is rather slow to dissolve in the solvent used and preparation of the solution is, therefore, a time consuming operation. Natural rubber is also susceptible to contamination in its raw state.

The object of the present invention is to provide a method of bonding rubber to P.V.C. which overcomes or reduces the disadvantages mentioned earlier and at the same time gives improved results over previous conventional methods when applied to natural rubber and which can, furthermore, when suitably modified, also be used to bond P.V.C. effectively to certain synthetic rubbers, particularly chloroprene rubbers. This latter aspect of the invention constitutes a marked advance over the known conventional art.

We have now found that in general, polyvinyl chloride may be bonded to natural or synthetic elastomers by means of a solution grafted copolymer of an acrylic monomer, such as methyl methacrylate and a synthetic elastomer, such as butadiene or chloroprene.

According to one form of the invention a method of bonding P.V.C. to natural rubber comprises contacting a gelled plasticised P.V.C. surface with a solution grafted copolymer of methyl methacrylate and butadiene prior to curing the rubber under the action of heat and pressure in contact with the prepared P.V.C. surface.

The above method enables a firm bond to be obtained between the P.V.C. and the vulcanised elastomer at normal ambient temperatures but the joint still suffers from the disadvantages of earlier conventional methods in that the bond strength is seriously diminished at higher temperatures.

To overcome this objection according to the invention, acrylonitrile is added to the graft solution to form a solution grafted ter-polymer of methyl methacrylate, acrylonitrile and butadiene. It is found that the presence of acrylonitrile considerably enhances bond strengths at higher temperatures.

Both the described methods can be applied to forming bonds between sulphur modified chloroprene elastomers and P.V.C. They are not, however, suitable for bonding non-sulphur modified chloroprene elastomers to P.V.C. For this purpose it is necessary to use a modified form of the invention and it is found that good results can be achieved by replacing the polybutadiene with a non-sulphur modified chloroprene rubber preferably of the type sold under the registered trade mark "Neoprene WRT," thus forming a graft solution of methyl methacrylate and chloroprene rubber.

The addition of acrylonitrile does not contribute to bond strength in this form of the invention but it is found that satisfactory results can be achieved without further addition to the basic chloroprene/methyl methacrylate graft.

The manner in which the invention may be carried into effect is described by way of the following examples:

EXAMPLE 1

A graft of methyl methacrylate to butadiene was produced using the following materials in the proportions indicated.

| | |
|---|---|
| Masticated polybutadiene | 10 g |
| Toluene | 400 ml |
| Methyl methacrylate monomer | 21.3ml |
| Benzoyl peroxide (2% solution in toluene) | 4.4ml |

The polybutadiene was passed 10 times through a tight nip and dissolved in toluene. The monomers were then added followed by the benzoyl peroxide. Air in the vessel was displaced by flushing with "white spot" nitrogen which is a commercially available grade of nitrogen having a very low oxygen content and the mixture was heated in a water bath at 70° C. for 17 hours.

The prepared solution was painted on to the surface of the gelled plasticised P.V.C. before bringing into contact with the uncured natural rubber which was then cured under the action of heat and pressure. On allowing to cool and removing from the press it was found that a firm bond had been formed between the rubber and the P.V.C.

ADHESION TEST RESULTS

| Temperature | |
|---|---|
| 19° C | 35 lbs per inch width |
| 75° C | 21 lbs per inch width |
| 96° C | 15 lbs per inch width |

EXAMPLE 2

| | |
|---|---|
| Masticated polybutadiene | 10 g |
| Toluene | 400 ml |
| Methyl methacrylate monomer | 12.8ml |
| Acrylonitrile monomer | 4.5ml |
| Benzoyl peroxide (2% solution in toluene) | 4.4ml |

The procedure was followed as described in Example 1.

ADHESION TEST RESULTS

| Temperature | |
|---|---|
| 19° C | 68 lbs per inch width |
| 75° C | 34 lbs per inch width |
| 96° C | 16 lbs per inch width |

EXAMPLE 3

A graft was produced of Neoprene WRT/methyl methacrylate in the following proportions.

| | |
|---|---|
| Masticated Neoprene WRT | 10 parts by weight |
| Toluene | 148 parts by weight |
| Methyl methacrylate monomer | 20 parts by weight |
| Benzoyl peroxide (2% solution in toluene) | 8.7 parts by weight |

The Neoprene WRT was examined to ensure that it was clean and free from foreign matter and then lightly masticated before dissolving in toluene. The remaining ingredients were added and processed as described in Examples 1 and 2 except that the nitrogen flushing was omitted as Neoprenes are less liable to oxidative degradation. The amount of benzoyl peroxide was increased in this case to compensate for the diminished reactivity with Neoprene in comparison with polybutadiene.

ADHESION TEST RESULTS

| Temperature | |
|---|---|
| 19° C | 43 lbs per inch width |
| 75° C | 19 lbs per inch width |
| 96° C | 14 lbs per inch width |

Neoprene WRT is a Neoprene (polychloroprene) of the W-type and is described more fully in Kirk-Othmer "Encyclopedia of Chemical Technology" (Interscience Publishers), Second Edition, Volume 7, pages 705 to 715 at page 709.

I claim:

1. A method of bonding a surface of polyvinyl chloride to a surface of natural rubber or to a surface of a sulphur-modified chloroprene elastomer which comprises copolymerising polybutadiene and methyl methacrylate monomer in solution, applying the resultant solution to at least one of the surfaces to be bonded, contacting the surfaces to be bonded, and thereafter completing the bonding of the surfaces by the application of heat and pressure.

2. A method as claimed in claim 1 in which acrylonitrile is copolymerised with the polybutadiene and methyl methacrylate in solution to form the solution which is applied to the surface or surfaces to be bonded.

3. A method of bonding a surface of polyvinyl chloride to a surface of natural rubber which comprises forming a solution of polybutadiene, adding methyl methacrylate monomer to the solution, maintaining the solution at an elevated temperature to copolymerise the polybutadiene and methyl methacrylate in the solution, applying the resultant solution to the surface of the polyvinyl chloride, said polyvinyl chloride being gelled, plasticised polyvinyl chloride, contacting the polyvinyl chloride surface so treated with the surface of natural rubber, the natural rubber being uncured natural rubber, and thereafter curing the rubber by the application of heat and pressure to complete the bonding of the surfaces.

* * * * *

UNITED STATES PATENT OFFICE
CERTIFICATE OF CORRECTION

Patent No. 3,657,048                    Dated April 18, 1972

Inventor(s) JOHN C. GARDNER

It is certified that error appears in the above-identified patent and that said Letters Patent are hereby corrected as shown below:

In the heading, column 1, item [30] should read:

Foreign Application Priority Data

Nov. 28, 1967     Great Britain          53,995/67

In the heading, column 2, item [45] should read:

April 18, 1972

Signed and sealed this 8th day of August 1972.

(SEAL)
Attest:

EDWARD M. FLETCHER, JR.                ROBERT GOTTSCHALK
Attesting Officer                       Commissioner of Patents